(12) United States Patent
Murrin

(10) Patent No.: US 7,051,828 B2
(45) Date of Patent: May 30, 2006

(54) WHEEL MECHANISM FOR SKI-EQUIPPED VEHICLES

(76) Inventor: David Murrin, 25 Primrose La., Roosevelt, NY (US) 11575

( * ) Notice: Subject to any disclaimer, the term of this patent is extended or adjusted under 35 U.S.C. 154(b) by 360 days.

(21) Appl. No.: 10/765,195

(22) Filed: Jan. 28, 2004

(65) Prior Publication Data

US 2005/0161265 A1     Jul. 28, 2005

(51) Int. Cl.
*B62M 27/02*     (2006.01)
(52) U.S. Cl. ................. 180/190; 280/764.1; 280/766.1
(58) Field of Classification Search ................. 280/755, 280/764.1, 766.1, 767, 847, 848, 850; 180/190, 180/192, 193, 200
See application file for complete search history.

(56) References Cited

U.S. PATENT DOCUMENTS

| | | | |
|---|---|---|---|
| 2,424,641 A | 7/1947 | Swanson | |
| 2,708,978 A | 5/1955 | Robitaille | |
| 3,113,805 A | 12/1963 | Nodwell | |
| 3,477,734 A | 11/1969 | Albertson | |
| 3,552,515 A | 1/1970 | Tomita | |
| 3,696,877 A | 10/1972 | Dessureault | |
| 3,734,532 A | 5/1973 | Mattson | |
| 4,195,702 A | 4/1980 | Denis | |
| 4,462,480 A * | 7/1984 | Yasui et al. | 180/193 |
| 4,779,695 A * | 10/1988 | Yasui | 180/190 |
| 5,908,226 A | 6/1999 | Courtemanche | |
| 6,237,706 B1 * | 5/2001 | Karpik et al. | 180/9.52 |
| 6,823,957 B1 * | 11/2004 | Girouard et al. | 180/190 |
| 6,991,057 B1 * | 1/2006 | Imamura et al. | 180/193 |

* cited by examiner

*Primary Examiner*—Paul N. Dickson
*Assistant Examiner*—Toan C. To
(74) *Attorney, Agent, or Firm*—Donald R. Schoonover

(57) ABSTRACT

A wheel mechanism is adapted to move between a stored condition and a use condition on a snowmobile. The wheel mechanism is located adjacent to the front end of the vehicle so the ski runner elements on the front end of the vehicle can be lifted off the terrain when the wheel mechanism is deployed. This will permit the vehicle to be operated on both snow and/or ice covered surfaces and on dry surfaces, such as roads. The wheel mechanism can be altered to adapt to the particular terrain.

1 Claim, 1 Drawing Sheet

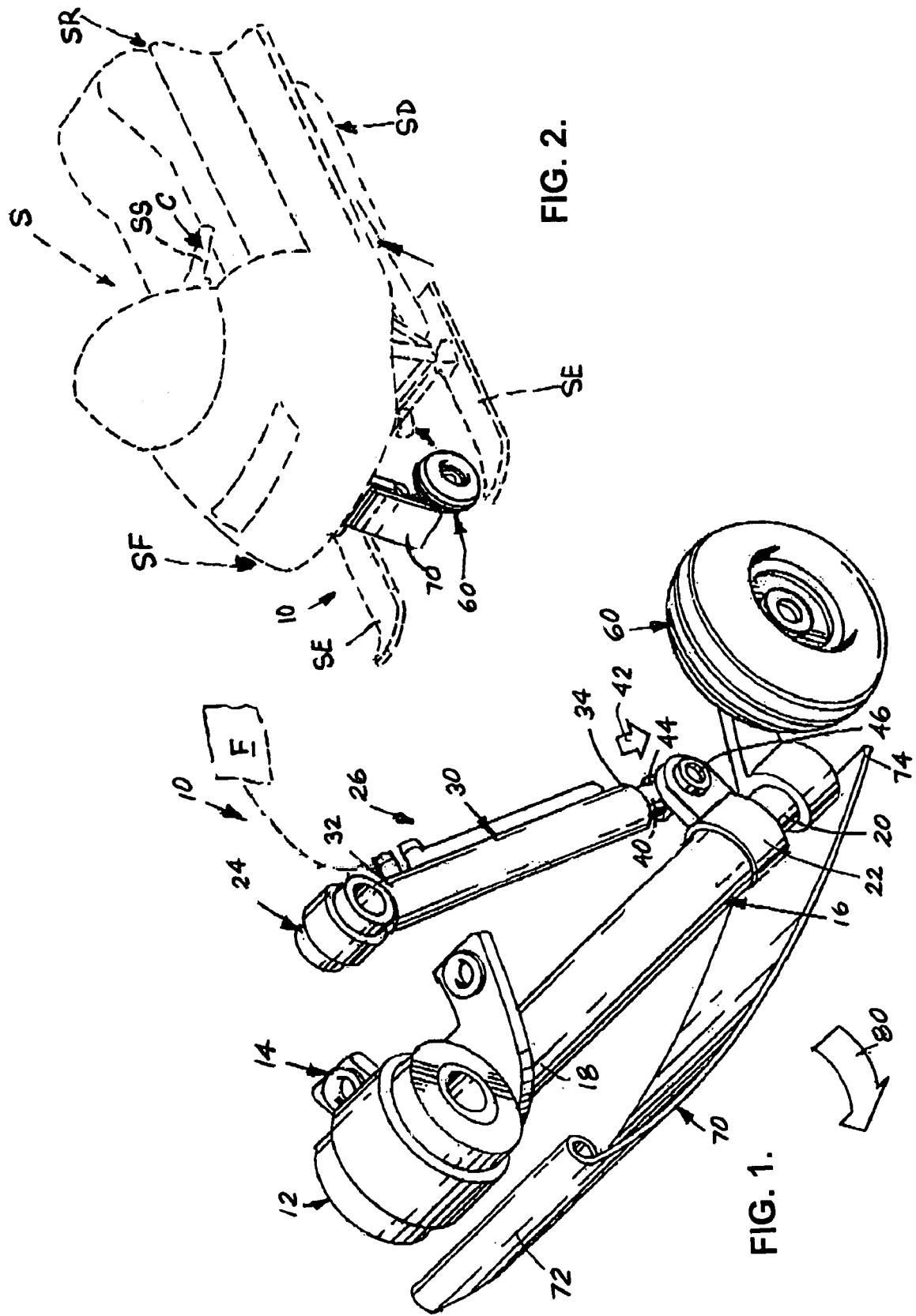

WHEEL MECHANISM FOR SKI-EQUIPPED VEHICLES

BACKGROUND OF THE INVENTION

1. Field of the Invention

The present invention relates to the general art of land vehicles, and to the particular field of land vehicles which include one or more ski-like runners.

2. Discussion of the Related Art

The sport of riding snowmobiles has become very popular in many areas. Obviously, riding a snowmobile is most popular where there are deep packs of snow and/or ice. Generally, a snowmobile has a continuously rotating drive track in the rear that contacts the snow and/or ice and ski-type runner elements in the front that ride on the snow and/or ice.

While this construction is quite efficient for snow and/or ice surfaces, many snowmobiles encounter terrain that is covered by snow and/or ice and is also free of such covering. In such situations, many snowmobiles are not efficient and, in some cases, cannot be operated at all due to the lack of proper ground covering.

Therefore, there is a need for a mechanism that can be used to permit a snowmobile to operate on snow- or ice-covered surfaces and also on snow-free surfaces.

Since a person operating a snowmobile does not wish to stop operation of the vehicle to change the configuration of the vehicle, any system on such a vehicle that is intended to accommodate both snow and/or ice covered surfaces as well as surfaces that are not covered with snow or ice should be easy and quick to change or such a system may not be commercially viable.

Therefore, there is a need for a mechanism that can be used to permit a snowmobile to operate on snow- or ice-covered surfaces and also on snow-free surfaces and which can be quickly and easily deployed.

Any system that can be changed from one configuration to another should be secure in either configuration. That is, if the system is in the snow/ice-engaging mode, it should be very secure in that configuration, and if the system is in the road-engaging mode, it should also be very securely maintained in that mode as well.

Therefore, there is a need for a mechanism that can be used to permit a snowmobile to operate on snow- or ice-covered surfaces and also on snow-free surfaces and which can be quickly and easily deployed and which is securely stored when not in use.

Since snowmobiling is such a popular passtime, many people already own a snowmobile. To be most commercially successful, any mechanism or accessory for such vehicles should be adaptable for use on either new or existing vehicles. If the mechanism or accessory is to be used on an existing vehicle, it should be very easy to be retrofit onto the existing vehicle or owners of such vehicles will not accept the accessory.

Therefore, there is a need for a mechanism that can be used to permit a snowmobile to operate on snow- or ice-covered surfaces and also on snow-free surfaces and which can be easily and quickly retrofit on an existing snowmobile.

Any accessory for a vehicle such as a snowmobile should obtain more commercial success if that accessory enhances already-existing features of the vehicle. Thus, any snowmobile accessory that is intended to enable the vehicle to operate on snow- or ice-free surfaces will be more acceptable if that same feature can be used to enhance the operation of the vehicle on snow or ice as well, if desired.

Therefore, there is a need for a mechanism that can be used to permit a snowmobile to operate on snow- or ice-covered surfaces and also on snow-free surfaces and can be used to enhance the steering capability of a snowmobile on snow.

PRINCIPAL OBJECTS OF THE INVENTION

It is a main object of the present invention to provide a mechanism that can be used to permit a snowmobile to operate on both snow- or ice-covered surfaces and snow-free surfaces.

It is another object of the present invention to provide a mechanism that can be used to permit a snowmobile to operate on snow- or ice-covered surfaces and on snow-free surfaces and which can be quickly and easily deployed.

It is another object of the present invention to provide a mechanism that can be used to permit a snowmobile to operate on snow- or ice-covered surfaces and on snow-free surfaces and which can be quickly and easily deployed and which is securely stored when not in use.

It is another object of the present invention to provide a mechanism that can be used to permit a snowmobile to operate on snow- or ice-covered surfaces and on snow-free surfaces and which can be easily and quickly retrofit on an existing snowmobile.

It is another object of the present invention to provide a mechanism that can be used to permit a snowmobile to operate on snow- or ice-covered surfaces and on snow-free surfaces and can be used to enhance the steering capability of a snowmobile on snow.

SUMMARY OF THE INVENTION

These, and other, objects are achieved by a wheel mechanism for use on ski-equipped vehicles such as snowmobiles which comprises a strut which is pivotally attached to the vehicle and a telescoping piston unit which is also pivotally attached to the vehicle adjacent to the strut. A wheel is attached to the strut. When the telescoping piston is extended, the strut pivots and the wheel is moved outwardly and downwardly with respect to the front of the vehicle. The wheel is lifted when the piston is retracted. The wheel can thus be moved between a stored position away from the surface on which the vehicle is riding and a deployed or use position engaging the surface on which the vehicle is riding. In the use position, the wheel can lift the front of the vehicle off of the surface far enough to lift ski runner elements on the front of the vehicle off the surface. Thus, the vehicle will be supported by its drive mechanism in the rear of the vehicle and the wheel when the wheel mechanism embodying the present invention is in the deployed position and is supported on the drive mechanism in the rear of the vehicle and the ski runner elements on the front of the vehicle when the mechanism embodying the present invention is in the stored position. However, the wheel can also be deployed only so far as to contact the ground and not elevate the runner elements whereby the wheel can be used for additional steering control.

Using the mechanism embodying the present invention will permit a snowmobile to be operated on both snow- or ice-covered surfaces and snow-free surfaces. The mechanism is securely stored but is quickly and easily deployed so a user can adapt his or her vehicle to the particular terrain on which the vehicle is being operated. The wheel included in the mechanism can be changed to meet the requirements of the terrain. For example, one wheel can be used for road surfaces, while another wheel can be used on dirt surfaces and yet another wheel can be used on ice, and so on. The ability to be quickly deployed permits the mechanism embodying the present invention to be used in conjunction with the ski runner elements on the front of a snowmobile so improved and enhanced steering can be realized. The mechanism embodying the present invention is easily retrofit onto an existing vehicle so the owner of an existing snowmobile need not incur great expense or go to great lengths to realize the benefits of the mechanism embodying the present invention.

BRIEF DESCRIPTION OF THE DRAWING FIGURES

FIG. 1 is a perspective view of a mechanism embodying the present invention which is used to lift the ski runner elements on the front of a snowmobile off the surface.

FIG. 2 is a perspective view of a snowmobile which includes the mechanism embodying the present invention.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a wheel mechanism 10 for use on ski-equipped vehicles such as a snowmobile S.

Mechanism 10 comprises a first pivot unit 12 which is adapted to be fixedly secured to a snowmobile having a front end SF and a rear end SR with a drive mechanism SD located in the rear end of the snowmobile and ground-engaging ski runner elements SE on the front end of the snowmobile. The drive mechanism of the snowmobile can be a track mechanism or the like as will be known to those skilled in the art. The exact drive mechanism associated with the snowmobile is not part of the invention and thus will not be further described. The first pivot unit is located near the front end of the snowmobile as can be understood from FIG. 2.

A steering yoke 14 is adapted to be operatively connected to a steering system SS of the snowmobile with the operative connection being understood by those skilled in the art based on the teaching of this disclosure.

A strut 16 has a proximal end 18 pivotally secured to first pivot unit 12 and is operatively connected to steering yoke 14. Strut 16 has a distal end 20.

A connection element 22 is mounted on the strut 16 near the distal end 20 of the strut 16.

A second pivot unit 24 is adapted to be fixedly secured to the snowmobile adjacent to the first pivot unit.

A hydraulic unit 26 includes a housing 30 which has a proximal end 32 connected to the second pivot unit 24 and a distal end 34.

A hydraulic ram 40 is telescopingly accommodated in the housing 30 of the hydraulic unit 26 to move into and out of the hydraulic housing 30 as indicated by arrow 42 in FIG. 1. The hydraulic ram 40 has a distal end 44.

A third pivot connection 46 is also connected to the strut 16. The distal end 44 of the hydraulic ram 40 of the hydraulic unit 26 is pivotally connected to third pivot connection 46.

A source of hydraulic fluid F is fluidically connected to the housing 30 of the hydraulic unit 26 and is operatively connected to a control system C on the snowmobile in a manner known to those skilled in the art based on the teaching of this disclosure.

A ground-engaging wheel 60 is fixedly mounted on the strut 16 at the distal end 20 of the strut 16. Wheel 60 can be any wheel which is suitable for the terrain that will be encountered by the snowmobile.

A shield 70 has a proximal end 72 pivotally mounted on the snowmobile adjacent to the first pivot unit 12 and a distal end 74 connected to the distal end 20 of the strut 16.

Strut 16 and hydraulic unit 26 and shield 70 and ground-engaging wheel 60 are all movable between a stored orientation indicated in FIG. 2 in dotted lines, with the ground-engaging wheel 60 located adjacent to the snowmobile and a use orientation, indicated in solid lines in FIG. 2, with the ground-engaging wheel 60 spaced apart from the snowmobile. Movement of these elements from a stored orientation toward a use orientation is indicated in FIG. 1 by arrows 42 and 80. The reverse movement will be understood by those skilled in the art based on the teaching of the present disclosure. The ground-engaging wheel 60 supports the front end of the snowmobile and elevates the ground-engaging runner elements off of the ground when the ground-engaging wheel 60 is in the use orientation whereby the snowmobile is supported by the ground-engaging wheel 60 and the drive mechanism of the snowmobile when the ground-engaging wheel 60 is in the use orientation and the snowmobile is supported by the drive mechanism and the ground-engaging runner elements when the ground-engaging wheel 60 is in the stored orientation.

Use of the mechanism 10 will be understood from the foregoing, and thus will only be briefly discussed. If one wishes to operate the vehicle on snow or ice, mechanism 10 is maintained in the stored orientation with the ground-engaging wheel 60 spaced apart from the ground and the ground-engaging runner elements are used in conjunction with the drive mechanism of the vehicle to propel the vehicle in the manner usual to snowmobiles. However, if the vehicle is to be operated on a dry road or other such dry surface, the operator activates mechanism 10 using the control system on the vehicle to lower the ground-engaging wheel 60 in directions 42 and 80 away from the stored orientation and into a use orientation with the ground-engaging wheel 60 in contact with the ground over which the vehicle will traverse. Wheel 60 is lowered until the vehicle is supported by the wheel 60 in place of the runner elements and the runner elements are elevated off the supporting surface. The vehicle is then propelled by the drive mechanism and is supported by the drive mechanism and wheel 60. Wheel 60 can also be lowered so that it merely engages the supporting surface and does not elevate the runner elements off of the surface if additional steering control is desired when the vehicle is still on ice or snow and the runner elements are still being used to support the vehicle. Wheel 60 can be a snow tire, a tire that is equipped for ice or the like as is suitable and desired by the operator of the vehicle.

It is understood that while certain forms of the present invention have been illustrated and described herein, it is not to be limited to the specific forms or arrangements of parts described and shown.

What is desired to be covered by Letters Patent is as follows:

1. A wheel mechanism for use on snowmobiles comprising:
    a) a first pivot unit which is adapted to be fixedly secured to a snowmobile having a front end and a rear end with a drive mechanism located in the rear end of the snowmobile and ground-engaging ski runner elements on the front end of the snowmobile, said first pivot unit being located near the front end of the snowmobile;
    b) a steering yoke that is adapted to be operatively connected to a steering system on the snowmobile;

c) a strut having a proximal end pivotally secured to said first pivot unit and which is operatively connected to said steering yoke and a distal end;
d) a connection element on said strut near the distal end of said strut;
e) a second pivot unit which is adapted to be fixedly secured to the snowmobile adjacent to said first pivot unit;
f) a hydraulic unit which includes
   (1) a housing having a proximal end connected to said second pivot unit and a distal end,
   (2) a hydraulic ram telescopingly accommodated in the housing of said hydraulic unit to move into and out of the hydraulic housing, the hydraulic ram having a distal end,
   (3) a third pivot connection on said strut, the distal end of the hydraulic ram of said hydraulic unit being pivotally connected to the third pivot connection, and
   (4) a source of hydraulic fluid fluidically connected to the housing of said hydraulic unit and operatively connected to a control system on the snowmobile;
g) a ground-engaging wheel fixedly mounted on said strut at the distal end of said strut;
h) a shield having a proximal end pivotally mounted on the snowmobile adjacent to said first pivot unit and a distal end connected to the distal end of said strut; and
i) said strut and said hydraulic unit and said shield and said ground-engaging wheel all movable between a stored orientation with said ground-engaging wheel located adjacent to the snowmobile and a use orientation with said ground-engaging wheel spaced apart from said snowmobile, said ground-engaging wheel supporting the front end of the snowmobile and elevating the ground-engaging runner elements off of the ground when said ground-engaging wheel is in the use orientation whereby the snowmobile is supported by said ground-engaging wheel and the drive mechanism of the snowmobile when said ground-engaging wheel is in the use orientation and the snowmobile is supported by the drive mechanism and the ground-engaging runner elements when the ground-engaging wheel is in the stored orientation.

* * * * *